United States Patent [19]

Borsuk

[11] 4,191,447
[45] Mar. 4, 1980

[54] FIBER OPTIC TERMINATION AND METHOD OF MAKING SAME

[75] Inventor: Leslie M. Borsuk, Los Alamitos, Calif.

[73] Assignee: International Telephone and Telegraph Corporation, New York, N.Y.

[21] Appl. No.: 900,424

[22] Filed: Apr. 27, 1978

[51] Int. Cl.² ............................................. G02B 5/14
[52] U.S. Cl. ............................... 350/96.20; 350/96.18; 65/31
[58] Field of Search ................. 350/96.18, 96.20; 65/31, 37, DIG. 7

[56] References Cited

U.S. PATENT DOCUMENTS

| 2,424,064 | 7/1947 | Stegeman | 350/96.18 |
| 3,932,023 | 1/1976 | Humer | 350/96.18 |
| 4,135,781 | 1/1979 | Archer | 350/96.20 |

FOREIGN PATENT DOCUMENTS 2308115  11/1976  France .................................. 350/96.20

*Primary Examiner*—Rolf G. Hille
*Attorney, Agent, or Firm*—Thomas L. Peterson

[57] ABSTRACT

A fiber optic termination is disclosed in which an optical fiber is inserted into a ferrule having an annular groove formed in the wall of the bore passing through the ferrule adjacent to the forward mating end thereof. The forward end of the fiber is located in the bore adjacent to the groove and is heated in situ to form an enlarged spherical lens on the end of the fiber. The periphery of the lens extends into the groove to retain the fiber in the ferrule without the use of an adhesive.

10 Claims, 3 Drawing Figures

FIBER OPTIC TERMINATION AND METHOD OF MAKING SAME

BACKGROUND OF THE INVENTION

The present invention relates generally to the field of optical fiber communications and, more particularly, to an optical fiber termination and a method of making the same.

U.S. Pat. Nos. 3,910,677 and 3,932,023 disclose optical fibers having integral lenses formed on the forward ends thereof. U.S. Pat. No. 3,910,677 discloses that an integral lens may be formed on a fiber by melting the end of the fiber. The melting of the fiber and creates an extremely smooth, clear lens surface. Thus, the lens not only provides an appreciable improvement in optical coupling efficiency, but also it avoids the tedious grinding and polishing operations normally required for the mating end faces of optical fibers.

It is currently the practice to mount optical fibers into ferrules by the use of a suitable adhesive. This procedure is time consuming and expensive.

It is the object of the present invention to retain an optical fiber, having an integral spherical lens formed on its mating end, in a ferrule of an optical fiber termination without the use of adhesives.

SUMMARY OF THE INVENTION

According to a principal aspect of the present invention, there is provided a fiber optic termination comprising a ferrule having a bore extending from the front mating end to the rear thereof. A recess is formed in the wall of the bore spaced behind the front end of the ferrule. An optical fiber mounted in the bore embodies an integral, enlarged forward lens portion which extends into the recess thereby restricting axial movement of the fiber in the ferrule bore, without the necessity of an adhesive.

According to another aspect of the invention, there is provided a method for making the aforementioned fiber optic termination in which the optical fiber is inserted into the ferrule from the rear until the forward end portion of the fiber is aligned with the recess formed in the wall of the bore in the ferrule. Thereafter, the integral, enlarged lens is formed in situ on the forward end portion of the fiber with the periphery of the lens extending into the recess. In the preferred embodiment, the lens is formed by fusing the end portion of the fiber by use of a heat source located adjacent to the forward end of the ferrule.

DESCRIPTION OF THE PREFERRED EMBODIMENT

Figure 1:
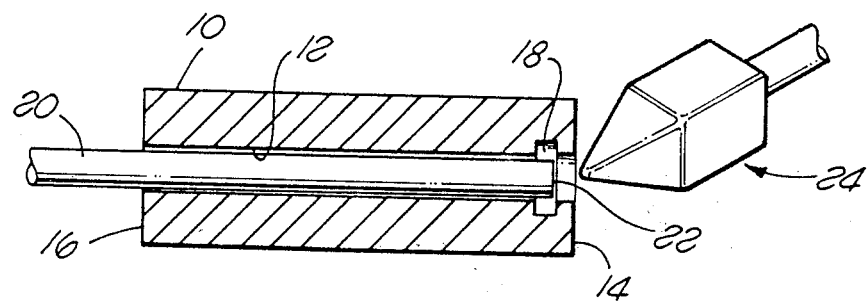
FIG. 1 is a longitudinal partial sectional view of the optical fiber termination of the present invention, prior to the forming of the lens on the end of the fiber.

Referring now to FIG. 1 of the drawing in detail, there is illustrated a ferrule 10 having a cylindrical bore 12 extending from the front mating end 14 of the ferrule to the rear 16 thereof. An annular groove 18 is formed in the wall of the bore 12 spaced behind the front mating end 14 of the ferrule. An optical fiber 20 is inserted into the bore 12 from the rear 16 of the ferrule until the front end 22 of the fiber is aligned with the groove 18.

The optical fiber 20 may be of any suitable type which, when the end is heated, will form an integral spherical lens. The preferred fiber for practicing the present invention is an acrylic plastic optical fiber, although it will be appreciated that other fibers may be used meeting the foregoing requirement.

Figure 2:
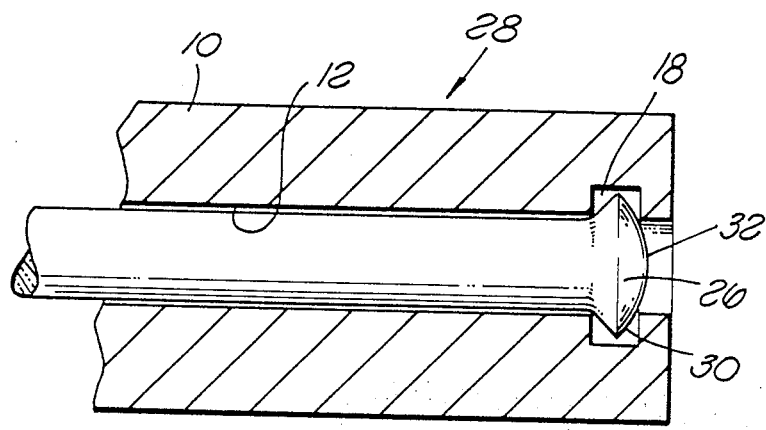
FIG. 2 is a partial longitudinal sectional view of the optical fiber termination of the invention showing the lens locked into a recess in the bore extending through the ferrule.
Figure 3:
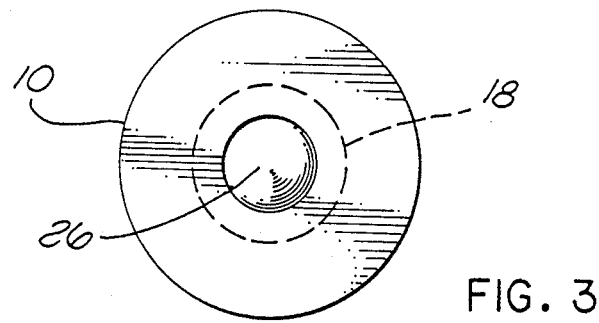
FIG. 3 is a front end view of the ferrule illustrated in FIG. 2.

In accordance with the invention, a heat source, such as a soldering iron 24, is positioned adjacent to the front of the ferrule 10. The heat source must heat the end of the optical fiber above its melting temperature and must be retained adjacent to the fiber for a sufficient time to form a forward lens portion 26 on the end of the fiber. Such lens is illustrated in FIG. 2 in the completed termination, generally designated 28. It is noted that the peripheral region 30 of the lens 26 extends into the annular groove 18 in the ferrule so that the lens serves to lock the fiber in the ferrule. The front face 32 of the lens formed by heat in this manner has a spherical configuration which enhances power emanating from an optical source which is coupled to the rear of the fiber 20 and thus improves optical coupling efficiency between a pair of mating optical fiber terminations 28.

While a soldering iron has been shown as being a suitable heat source for forming the lens 26 on the fiber 20, it will be appreciated that other heat sources could be used, such as a flame from a suitable torch. The composition of the optical fiber, and the size thereof, will dictate the amount of heat and duration of heating required to form the integral lens, which can be readily determined by simple experimentation by those skilled in the art.

It will be appreciated that by fusing the integral lens 26 in situ on the fiber 20 in the ferrule 10, there is provided by the present invention in a single step a lens for the termination as well as an effective means for retaining the fiber in the ferrule 10 without the necessity of using an adhesive.

The present invention reduces the labor required to provide adequate retention of an optical fiber in a ferrule, with the added advantage that a lens is provided on the end of the fiber. The method of the invention also increases the reliability of the termination by requiring less handling of parts and materials during the assembly process. The invention increases the feasibility of short length fiber optic links which have applications today in automotive and office equipment systems. The invention will also decrease the demand on the optical power output of the light source coupled to the rear of the fiber 20 by reducing the cabling interconnection attenuation.

What is claimed is:

1. A fiber optic termination comprising:
   a ferrule having a front mating end and a rear;
   a bore extending axially through said ferrule from said rear to said front end;
   a recess in the wall of said bore spaced behind said front end; and
   an optical fiber inserted into said bore from said rear, said fiber embodying an integral, enlarged forward lens portion extending into said recess to thereby restrict forward and rearward axial movement of said fiber in said bore.

2. A fiber optic termination as set forth in claim 1 wherein:
said recess is an annular groove; and
said enlarged forward lens portions embodies an annular peripheral region extending into said groove.

3. A fiber optic termination as set forth in claim 1 wherein:
said optical fiber is a plastic fiber.

4. A fiber optic termination as set forth in claim 1 wherein:
the front face of said forward lens portion has a generally spherical configuration.

5. A fiber optic termination as set forth in claim 1 wherein:
said forward end lens portion is fused in situ.

6. A method of making a fiber optic termination comprising the steps of:
providing a ferrule having a bore therethrough and a recess in the wall of said bore behind the front mating end of the ferrule;
inserting an optical fiber from the rear of said ferrule into said bore until the forward end portion of said fiber is aligned with said recess; and
thereafter forming an integral, enlarged lens on said forward end portion of said fiber with the periphery of said lens extending into said recess.

7. A method as set forth in claim 6 wherein:
said lens is formed by fusing said end portion of said fiber.

8. A method as set forth in claim 7 wherein:
the fusing of said lens is accomplished by positioning a heat source adjacent to said front end of said ferrule.

9. A method as set forth in claim 6 wherein:
said optical fiber is a plastic fiber.

10. A fiber optic termination as set forth in claim 1, wherein:
the portion of said ferrule in which said recess is formed is constructed of a single piece of material.

* * * * *